United States Patent [19]

Puydak et al.

[11] Patent Number: 5,403,892
[45] Date of Patent: Apr. 4, 1995

[54] DYNAMICALLY CURED THERMOPLASTIC OLEFIN POLYMERS AND PROCESS FOR PRODUCING THE SAME

[75] Inventors: Robert C. Puydak, Akron, Ohio; Cindy B. Shulman, Houston, Tex.; Donald R. Hazelton, Hudson, Ohio

[73] Assignee: Advanced Elastomer Systems, L.P., St. Louis, Mo.

[21] Appl. No.: 951,638

[22] Filed: Sep. 25, 1992

Related U.S. Application Data

[63] Continuation-in-part of Ser. No. 570,430, Aug. 21, 1990, abandoned.

[30] Foreign Application Priority Data

Aug. 20, 1991 [JP] Japan .................. 3-208233
Jan. 29, 1992 [EP] European Pat. Off. ......... 91870126
Feb. 22, 1992 [CA] Canada ................. 2049564

[51] Int. Cl.⁶ ............. C08L 23/26; C08L 31/04; C08L 23/16; C08L 23/22
[52] U.S. Cl. .............. 525/192; 525/193; 525/194; 525/195; 525/196; 525/197; 525/211; 525/222; 525/227
[58] Field of Search ......... 525/240, 211, 222, 214, 525/193, 194, 197, 195, 196, 192

[56] References Cited

U.S. PATENT DOCUMENTS

| | | | |
|---|---|---|---|
| 3,037,954 | 6/1962 | Gessler et al. | 524/66 |
| 3,361,850 | 1/1968 | Young | 525/211 |
| 3,941,859 | 3/1986 | Batiuk et al. | 525/211 |
| 4,102,855 | 7/1978 | Kuan et al. | 524/522 |
| 4,210,579 | 7/1980 | Grigo et al. | 525/88 |
| 4,243,576 | 1/1981 | Fischer et al. | 523/212 |
| 4,340,684 | 7/1982 | Bohm et al. | 525/194 |
| 4,500,681 | 2/1985 | Shulman | 525/222 |
| 4,607,074 | 8/1986 | Hazelton et al. | 524/425 |
| 4,639,487 | 1/1987 | Hazelton et al. | 524/425 |
| 4,713,419 | 12/1987 | Takimoto et al. | 525/211 |
| 4,774,277 | 9/1988 | Janac et al. | 524/474 |
| 4,851,468 | 7/1989 | Hazelton et al. | 524/519 |
| 4,894,408 | 1/1990 | Hazelton et al. | 524/425 |
| 4,937,303 | 6/1990 | Wolf et al. | 526/212 |
| 5,013,793 | 5/1991 | Wang et al. | 525/195 |
| 5,051,478 | 9/1991 | Puydak et al. | 525/195 |
| 5,086,121 | 2/1992 | Hazelton et al. | 525/197 |

FOREIGN PATENT DOCUMENTS

| | | | |
|---|---|---|---|
| 0172645 | 2/1986 | European Pat. Off. | 525/222 |
| 0329288 | 8/1989 | European Pat. Off. | |
| 2811550 | 9/1979 | Germany | 525/222 |

Primary Examiner—James J. Seidleck
Assistant Examiner—M. L. Warzel
Attorney, Agent, or Firm—W. A. Skinner

[57] ABSTRACT

A dynamically vulcanized thermoplastic composition is provided which comprises a polymer blend of (a) a thermoplastic olefinic resin, such as non-elastomeric ethylene vinyl acetate copolymer; (b) an elastomeric ethylene vinyl acetate copolymer having a relatively higher vinyl acetate content; and (c) a specified elastomeric copolymer, such as halobutyl rubber, EPDM, or a halogenated copolymer of a $C_4$ to $C_7$ isomonoolefin and a para-alkylstyrene. Halogenated polyethylene may also be incorporated in the composition. The dynamically vulcanized thermoplastic composition is suitable for adhesion to polyvinyl chloride.

16 Claims, No Drawings

DYNAMICALLY CURED THERMOPLASTIC OLEFIN POLYMERS AND PROCESS FOR PRODUCING THE SAME

CROSS-REFERENCE TO RELATED APPLICATION

This application is a continuation-in-part of U.S. patent application Ser. No. 570,430, Filed Aug. 21, 1990, now abandoned.

BACKGROUND OF THE INVENTION

1. Field of the Invention

The invention relates to dynamically vulcanized thermoplastic compositions having improved adhesion properties and a process for preparing the compositions.

2. Description of Information Disclosures

In recent years, there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessability of thermoplastic resins. The elastomeric characteristics are enhanced if one component of the blend is a vulcanizable elastomer which is wholly or partially crosslinked.

The earliest work in the curing of TPO compositions was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler's U.S. Pat. No. 3,037,954 discloses compositions comprising polypropylene and a rubber wherein the rubber may be, butyl rubber, chlorinated butyl rubber, polybutadiene, polychloroprene and polyisobutene.

U.S. Pat. No. 4,340,684 discloses a blend of a crystalline 1-olefin polymer, a styrene-butadiene rubber and a highly saturated elastomer. The highly saturated elastomer may be an ethylene-vinyl acetate copolymer (EVA). The compositions may be partially cured under dynamic conditions (col. 8, lines 60 to 68).

U.S. Pat. No. 4,607,074 discloses dynamically vulcanized thermoplastic compositions comprising a polyolefin resin, an uncured rubber and a fully cured rubber. The polyolefin resin may be EVA or EVA may be included along with the polypropylene or polyethylene as the resin. A preferred composition includes polypropylene and ethylene-vinyl acetate as the polyolefin resin.

U.S. Pat. No. 4,210,579 discloses a thermoplastic mixture of ethylene-propylene polymer or ethylene-propylene-diene polymer, a crystalline polypropylene and ethylene-vinyl acetate (EVA).

U.S. Pat. Nos. 4,639,487; 4,851,468 and 4,894,408 also disclose dynamically vulcanized compositions comprising ethylene-vinyl acetate.

There is still a need to improve the adhesion properties of dynamically vulcanized compositions, particularly for adhesion to highly plasticized vinyl and to rigid polyvinyl chloride, when used, for example, for co-extrusion or coinjection molding with the vinyl plastic or for heat sealing to the vinyl plastic.

It has now been found that the adhesion properties of elastomeric thermoplastic compositions can be improved by dynamically vulcanizing a blend of specified polymers.

SUMMARY OF THE INVENTION

In accordance with the invention, there is provided a thermoplastic composition comprising a dynamically vulcanized polymer blend of (a) a thermoplastic olefinic resin selected from the group consisting of low density polyethylene, linear low density polyethylene, very low density polyethylene, ethylene copolymer resins, plastomeric copolymers of ethylene and 1-alkene and mixtures thereof; (b) an elastomeric ethylene-vinyl acetate copolymer having a vinyl acetate content of at least about 30 weight percent; and (c) an elastomeric copolymer selected from the group consisting of a copolymer of a $C_4$ to $C_7$ isomonoolefin and a $C_4$ to $C_{14}$ multiolefin; a halogenated copolymer of a $C_4$ to $C_7$ isomonoolefin and a $C_4$ to $C_{14}$ multiolefin; a halogenated copolymer of a $C_4$ to $C_7$ isomonoolefin and a para-alkylstyrene; a terpolymer of ethylene, at least one higher alpha olefin, and at least one non-conjugated diene; natural rubber, and mixtures thereof.

DETAILED DESCRIPTION OF THE INVENTION

The thermoplastic composition of the present invention comprises a thermoplastic olefinic resin, an elastomeric ethylene vinyl acetate polymer, an elastomeric copolymer of specified polymers or natural rubber and optionally, a halogenated polyethylene.

The term "dynamic vulcanization" is used herein to connote a vulcanization process in which a thermoplastic olefinic resin and a vulcanizable elastomer are vulcanized under conditions of high shear. As a result, the vulcanizable elastomer is simultaneously crosslinked and dispersed as fine particles of a "micro gel" within the thermoplastic olefinic resin matrix.

Dynamic vulcanization is effected by mixing the TPO ingredients at a temperature which is at or adore the curing temperature of the elastomer in equipment such as roll mills, Banbury ® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

The dynamically vulcanized alloys (DVA) are generally prepared by blending together the thermoplastic resins and elastomers with curatives and fillers under conditions of dynamic vulcanization.

In preparing the preferred dynamically vulcanized composition of the present invention, at least one thermoplastic olefinic resin is blended with a curable elastomeric copolymer and an elastomeric ethylene vinyl acetate copolymer.

The Thermoplastic Olefinic Resin Component (A)

Suitable thermoplastic olefinic resins include low density polyethylene (LDPE), linear low density polyethylene (LLDPE), very low density polyethylene (VLDPE); ethylene copolymer resins, plastomeric copolymers of ethylene and 1-alkene, and mixtures thereof.

The term "low density polyethylene" or "LDPE" as used herein mean both low and medium density polyethylene having densities of about 0.91 to about 0.94 g/cc. The terms include linear polyethylene as well as copolymers of ethylene which are thermoplastic resins.

The term "very low density polyethylene" or "VLDPE" is used herein to mean polyethylene having a density below about 0.91 g/cc and includes linear polyethylene as well as copolymers of ethylene which are thermoplastic resins.

Linear low density polyethylene (LLDPE) is characterized by little, if any, long chain branching, in contrast to conventional LDPE. The processes for producing LLDPE are well known in the art and commercial grades of this thermoplastic olefinic resin are available. Generally, it is produced in gas-phase fluidized bed reactors or liquid-phase solution process reactors; the former process can be carried out at pressures of about 100. to 300 psi and temperatures as low as 100° C.

The term "ethylene copolymer resin" is used herein to denote copolymers of ethylene and vinyl acetate, copolymers of ethylene and an alpha, beta monoethylenically unsaturated monocarboxylic acid, and copolymers of ethylene and an alkyl ester of an alpha, beta monoethylenically unsaturated carboxylic acid. Suitable ethylene copolymer resins include copolymers of ethylene and vinyl acetate or alkyl acrylates, for example, methyl acrylate, ethyl acrylate, butyl acrylate and mixtures thereof. These ethylene copolymer resins may comprise from about 70 to about 98 weight percent ethylene, preferably from about 80 to about 95 weight percent ethylene, more preferably from about 82 to about 92 weight percent ethylene. The ethylene-copolymer resins suitable for use in the practice of this invention include those having a melt index of about 0.2 to about 50 (ASTM D1238 Condition E). The preferred ethylene copolymer resin for the practice of the present invention is a non-elastomeric ethylene-vinyl acetate copolymer, herein designated "EVA", containing less than about 30 weight percent vinyl acetate. The vinyl acetate content of the EVA may range from about 2 to about 30 weight percent. Only one type of nonelastomeric EVA may be present in the thermoplastic olefinic resin component or a mixture of EVA copolymers of different vinyl acetate content of less than about 30 weight percent may be present, for example, low vinyl acetate EVA and medium vinyl acetate EVA may be used as the thermoplastic olefinic component. The vinyl acetate content of the EVA copolymers useful as component (a) may range, for example, from about 2 to about 9 percent, for low vinyl acetate EVA, and, for example, from about 20 to about 30 weight percent, for medium vinyl acetate EVA. A more preferred thermoplastic olefinic resin component comprises EVA as a major component and a suitable polyethylene as a minor component. By major component is intended herein above fifty weight percent of the thermoplastic olefinic resin component. The density of these non-elastomeric ethylene-vinyl acetate copolymers may range from about 0.92 to about 0.95. The Shore A hardness (measured according to ASTM D2240) of these non-elastomeric ethylene-vinyl acetate copolymers is preferably greater than about 68 Shore A.

The term "plastomeric copolymer of ethylene and 1-alkene" includes plastomeric copolymers of ethylene with 1-hexene or with 1-butene, respectively, wherein the hexene or butene content of the respective copolymers ranges from about 1 to about 50, preferably from about 10 to about 45, and most preferably from about 15 to about 40 weight percent. The ethylene-hexene or ethylene-butene copolymers suitable for use in the practice of this invention have a melt index (MI) measured by ASTM Standard D1238 Condition E ranging from about 0.3 to about 50, preferably from about 0.5 to about 10. The degree of crystallinity measured as a heat of fusion by DSC of the ethylene-hexene or ethylene-butene copolymer may range from about 5 to about 85 J/g. The preferred ethylene-hexene or ethylene-butene copolymers have a density ranging from about 0.870 to about 0.900.

The Elastomeric Ethylene Vinyl Acetate Copolymer Component (B)

Suitable elastomeric ethylene vinyl acetate copolymers (EVA) suitable as component (b) for the practice of this invention include ethylene-vinyl acetate copolymers having at least 40 weight percent vinyl acetate, preferably at least about 45 weight percent vinyl acetate. The vinyl acetate content may range from about 40 to about 70, preferably from about 45 to about 60 weight percent.

The elastomeric ethylene-vinyl acetate copolymers may have a melt index ranging from about 0.2 to about 50, a density of 0.950 to 1.02 g/cc, a heat of fusion of less than 18 cal./g, a Shore A hardness (ASTM D2240) of less than about 68 Shore A.

The elastomeric ethylene-vinyl acetate copolymer may be present in the composition of the present invention in an amount of at least 12 weight percent, preferably at least 14 weight percent, based on the weight of the polymer blend.

The Elastomeric Component (C)

The elastomeric component (c) of the composition of the present invention is selected from the group consisting of copolymer of a $C_4$ to $C_7$ isomonoolefin and a $C_4$ to $C_{14}$ multiolefin; a halogenated copolymer of a $C_4$ to $C_7$ isomonoolefin and a $C_4$ to $C_{14}$ multiolefin; a halogenated copolymer of a $C_4$ to $C_7$ isomonoolefin and a para-alkylstyrene; a terpolymer of ethylene, at least one higher alpha olefin, and at least one non-conjugated diene; natural rubber, and mixtures thereof.

Suitable copolymers of a $C_4$ to $C_7$ isomonoolefin and a $C_4$ to $C_{14}$ multiolefin for use as components of the composition of the present invention are known polymers and will be referred to herein as "butyl rubber." Suitable halogenated copolymers of a $C_4$ to $C_7$ isomonoolefin and a $C_4$ to $C_{14}$ multiolefin are known and can be produced by the halogenation of the corresponding copolymer. The halogenated copolymer of a $C_4$ to $C_7$ isomonoolefin and a $C_4$ to $C_{14}$ multiolefin will be referred to herein as "halogenated butyl rubber."

The term "butyl rubber" is used herein to designate a copolymer of an isoolefin and a conjugated multiolefin. Suitable butyl rubber comprises a major portion of an isoolefin and a minor amount, preferably not more than about 30 weight percent of a conjugated multiolefin. The preferred copolymers comprise about 85–99.5 wt. percent (preferably 95–99.5 wt. percent) of a $C_4$–$C_7$ isoolefin, such as isobutylene, and about 15–0.5 wt. percent (preferably about 5–0.5 wt. percent) of a multiolefin of about 4–14 carbon atoms. These copolymers are referred to in publications as "butyl rubber." The term "butyl rubber" as used herein includes the aforementioned copolymers of an isoolefin having 4 to 7 carbon atoms and about 0.5 to 20 wt. percent of a conjugated multiolefin of about 4 to 10 carbon atoms. Preferably these copolymers contain about 0.5 to about 5 percent conjugated multiolefin. The preferred isoolefin is isobutylene. Suitable conjugated multiolefins include isoprene, butadiene, dimethylbutadiene, piperylene, etc. The preferred conjugated multiolefin is isoprene. Commercial butyl rubber is a copolymer of isobutylene and minor amounts of isoprene.

Also included within the term "butyl rubber" as used herein are butyl terpolymer rubbers such as those comprising an isoolefin such as isobutylene, a conjugated multiolefin such as isoprene, and a divinyl aromatic monomer such as divinyl benzene. Such butyl terpolymer rubbers are more fully described in U.S. Pat. No. 4,916,180.

To produce the halogenated butyl rubber, a butyl rubber, as described above, is reacted with a halogenation agent, such as chlorine or bromine. Processes for producing halogenated butyl rubber are well known and are described for example, in U.S. Pat. Nos. 3,029,191; 2,940,960; and 3,099,644; the teachings of all of which are hereby incorporated by reference.

Suitable halogenated copolymers of a $C_4$ to $C_7$ isomonoolefin and a para-alkylstyrene include copolymers comprising the para-alkylstyrene moieties which may be represented by the formula:

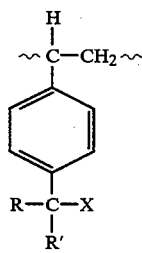

wherein R and R' are independently selected from the group consisting of hydrogen, alkyl groups having 1 to 5 carbon atoms, primary and secondary haloalkyl groups having from 1 to 5 carbon atoms, and X is selected from the group consisting of bromine, chlorine and mixtures thereof, such as those disclosed in European Patent Application 89305395.9 filed May 26, 1989 (Publication No. 0344021 published Nov. 29, 1989). Preferably the alkylstyrene copolymer is a halogenated copolymer of isobutylene and para-methyl-styrene, more preferably, the brominated copolymer of isobutylene and para-methylstyrene.

When a halogenated elastomeric copolymer is used as component (c), of the composition of the present invention, the halogen content of the copolymer may range from about 0.1 to 10 weight percent.

Suitable terpolymers for use as component (c) of the composition of the present invention include terpolymers of ethylene, at least one higher alpha olefin, and at least one non-conjugated diene. The term "higher alpha olefin" is used herein to denote alpha olefins having a higher molecular weight than ethylene. The terpolymer is generally substantially amorphous and can have a substantially random arrangement of at least the ethylene and the higher alpha olefin monomers.

The terpolymer will generally have a weight average molecular weight (Mw) in the range between about 10,000 and 1,000,000 or higher, typically between about 15,000 and 500,000, and more typically between about 20,000 and 350,000.

Typically, the terpolymer is "substantially amorphous," and when that term is used to define the terpolymer, it is to be taken to mean having a degree of crystallinity less than about 25 percent, preferably less than about 15 percent, and more preferably less than about 10 percent, as measured by means known in the art.

The terpolymer useful for the practice of the present invention may comprise from about 20 to 90 weight percent ethylene, preferably about 30 to 85 weight percent ethylene, and even more preferably about 35 to about 80 weight percent ethylene.

The higher alpha-olefins suitable for use in the preparation of the terpolymer are preferably $C_3$-$C_{16}$ alpha-olefins. Illustrative non-limiting examples of such alpha-olefins are propylene, 1-butene, 1-pentene, 1-hexene, 1-octene, and 1-dodecene. The alpha-olefin content of the terpolymer is generally from about 10 to about 80 weight percent, preferably from about 20 to about 70 weight percent. The preferred alpha-olefin for the purposes of this invention is propylene.

The non-conjugated dienes suitable for use in the preparation of the terpolymer include dienes having from 6 to 15 carbon atoms. Such diene monomers are selected from polymerizable dienes. Representative examples of suitable non-conjugated dienes that may be used to prepare the terpolymer include:

a. Straight chain acyclic dienes such as: 1,4 hexadiene; 1,5-heptadiene; 1-6 octadiene.
b. Branched chain acyclic dienes such as: 5-methyl-1, 4-hexadiene; 3, 7-dimethyl 1-6-octadiene, and 3,7-dimethyl 1, 7-octadiene.
c. Single ring alicyclic dienes such as: 4-vinylcyclohexene; 1-allyl, 4-isopropylidene cyclohexane; 3 allyl-cyclopentene;. 4-allyl cyclohexene; and 1-isopropenyl-4-butenyl cyclohexane.
d. Multi ring alicyclic fused and bridged ring dienes such as: dicyclopentadiene; alkenyl, alkylidene, cycloalkenyl and cycloalkylidene norbornenes such as: 5-methylene-2-norbornene 5-methylene-6-methyl-2-norbornene; 5-methylene-6, 6-dimethyl-2-norbornene; 5-propenyl-2-norbornene; 5-(3-cyclopentenyl)-2-norbornene; 5-ethylidene-2-norbornene; and 5-cyclohexylidene-2-norbornene, etc.

The preferred dienes are selected from the group consisting of 1,4-hexadiene; dicyclopentadiene; 5-ethylidene-2-norbornene; 5-methylene-2-norbornene; and mixtures thereof.

The total diene monomer content in the terpolymer may suitably range from about 0.1 to about 15 weight percent, preferably 0.5 to about 12 weight percent, and most preferably about 1.0 to about 6.0 weight.

Preparations of terpolymers of ethylene, a higher alpha olefin and a non-conjugated diene of the type described above are well known and form no part of this invention. The preferred terpolymers for the practice of the invention are terpolymers of ethylene, propylene and a non-conjugated diene (EPDM). Such terpolymers are commercially available.

Also useful as elastomeric component (c) of the compositions of this invention are natural rubbers.

The Halogenated Polyethylene Component (D)

Optionally, a halogenated polyethylene polymer component (i.e. component d) may be added to the composition of the present invention. The halogenated polyethylene polymer additionally increases the adhesion properties of the composition of the present invention.

The preferred halogenated polyethylene suitable as component of the composition of the invention is chlorinated polyethylene, preferably an elastomeric halogenated polyethylene. The halogen content of the halogenated polyethylene may ranged from about 5 to about 50 weight percent, preferably from about 20 to about 45 weight percent. The halogen may be bromine, chlorine and mixtures thereof. The preferred halogen is chlorine. The halogenated polyethylene component may be an amorphous elastomeric polymer or a crystalline polymer. Suitable halogenated polyethylene include amorphous elastomeric chlorinated polyethylene having a Mooney Viscosity of 20 to 80 (ML 1+8) at 121° C., and a heat of fusion of less than about 3 calories per gram; and crystalline chlorinated polyethylene having a Mooney Viscosity of at least 100, preferably at least 120 (ML 1+4) at 121° C., and a heat of fusion of at least about 11 calories per gram. The preferred halogenated polyethylene is an amorphous elastomeric chlorinated polyethylene.

In the dynamically vulcanized thermoplastic elastomeric composition of the present invention, the thermoplastic olefinic resin (a) may suitably be present in an amount ranging from about 15 to 60 weight percent, preferably from about 20 to 40 weight percent, the elastomeric EVA copolymer (b) may be present in an amount ranging from about 12 to 40 weight percent, preferably from about 15 to 30 weight percent, and the elastomeric copolymer (c) may be present in an amount ranging from about 20 to about 70 weight percent, preferably from about 30 to 60 weight percent, based on the polymer blend. When a halogenated polyethylene (d) is also present in the composition, it may be present in an amount ranging from about 5 to 30, preferably from about 10 to 25 based on the polymer blend.

The term "polymer blend" is used herein to denote the blend of the thermoplastic olefinic resin and the other polymer components, including any other optional polymers.

The preferred dynamically vulcanized alloy (DVA) composition of the invention comprises an ethylene-vinyl acetate copolymer having less than about 30 weight percent vinyl acetate, an elastomeric ethylene-vinyl acetate having at least about 45 weight percent vinyl acetate and chlorobutyl rubber or EPDM or mixtures thereof. A more preferred DVA comprises in addition to the above components also chlorinated polyethylene.

The polymer blend may comprise about 40 to about 90 wt. percent of the overall DVA composition. In addition to its polymer components, the DVA composition of the present invention may comprise flame retardants, fillers, antioxidants, stabilizers, rubber processing oils, lubricants (e.g., oleamide), antiblocking agents, waxes, foaming agents, pigments, coupling agents for the fillers and other processing aids known to the rubber compounding art. Metal oxides, e.g., MgO, can be included to act as acid acceptors. The pigments and fillers may comprise up to 30 wt. percent of the total DVA composition based on polymer components plus additives. Preferably, the pigments and fillers comprise about 10 to about 30 wt. percent based on the DVA composition, more preferably about 12 to about 25 wt. percent of the overall composition.

Fillers may be inorganic fillers such as talc, calcium carbonate, clays, silica or carbon black and mixtures thereof. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the DVA which is to be dynamically vulcanized. This ratio can vary from about 0.3/1 to about 1.3/1; preferably about 0.5/1 to about 1.2/1; more preferably about 0.8/1 to about 1.1/1. Oils other than petroleum based oils such as oils derived from coal tar and pine tar can also be utilized. In addition to the petroleum derived rubber process oils, organic esters and other synthetic plasticizers can be used. As used herein, the term "process oil" means both the petroleum derived process oils and synthetic plasticizers.

The process oil may be included in the DVA to insure that the DVA has good flow properties, e.g., spiral flow test reading of at least 16 cm. The quantity of oil utilized will depend in part on the amount of polymer blend and filler used as well as, to some extent, the type of cure system utilized. Generally, the process oil, when included, may comprise about 20 wt. percent of the DVA. Larger amounts of process oil can be used, the deficit being reduced physical strength of the DVA.

Antioxidants may be utilized in the composition of this invention. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

Any conventional cure system which is capable of vulcanizing the elastomeric copolymer component (c) to be dynamically vulcanized can be used except that peroxide cures are specifically excluded from the practice of the present invention since the peroxide would vulcanize the thermoplastic olefinic resin and thereby produce a fully cured non-thermoplastic composition. Otherwise any known curative for vulcanization of the chosen elastomeric component (c) is suitable. These include sulfur cures as well as non-sulfur cures. Accelerators such as dithiocarbonates or thiurams and thioureas may also be included in these sulfur cures which typically also include zinc oxide.

Resin cures are particularly useful for butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

While phenolic resin cures are suitable cures, they impart a yellowish or orangish tinge to the rubber part. For halogenated butyl rubber, a preferred cure is one based on ZnO and/or MgO. Such cures permit the use of pigments such as $TiO_2$ to give bright white compositions. In this system, the MgO acts not as an accelerator but as an acid acceptor to stabilize the rubber from dehydrohalogenation.

Halogenated butyl rubbers are preferably vulcanized with zinc oxide cures. Sulfur-bearing accelerators can be utilized with the zinc oxide.

Illustrative of accelerators which can be used in conjunction with ZnO for curing halobutyl rubber are 2,6-ditert-butyl-para-cresol; N,N'-diethylthiourea; diorthotolylguanidine; dipentamethylene thiuram tetrasulfide; ethylene trithiocarbonate; 2-mercapto-benzothiazole; benzothiazole disulfide; N-phenyl-beta-naphthylamine; tetramethyl thuiram disulfide; zinc diethyldithiocarbamate; zinc dibutyldithiocarbamate; and zinc dimethyldithiocarbamate. Formulations for the ZnO cure of halobutyl rubber are well known in the art. A preferred cure system comprises MgO, ZnO and a di-orthoguamidine salt of dicatechol borate (Permalux ®, Dupont) since this system results in a vulcanized rubber with low compression set.

It is within the scope of this invention to incorporate an uncured rubber in the composition. This can be accomplished by selecting as the uncured rubber a rubber which cannot be vulcanized by the vulcanizing agent used to cure the elastomeric component (c) which is to be dynamically vulcanized, or the uncured rubber may be added to the DVA after the dynamic vulcanization step at a temperature above the melting point of the resin.

The dynamic vulcanization is conducted at conditions and for a time sufficient to vulcanize component (c) at least partially, preferably at conditions to vulcanize the elastomeric copolymer (c) fully.

In the practice of this invention, the thermoplastic olefinic resin and other polymers are mixed together at a temperature sufficient to soften the resin or, more commonly, at a temperature above its melting point where the resin is crystalline at room temperature. After the resin and other polymers have been intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 50° C. in the case of EVA to about 250° C.); more typically, the temperature may range from about 150° C. to about 230° C. Preferably, the vulcanization is carried out at a temperature ranging from about 160° C. to about 180° C.

It is preferred that the mixing process be continued until the desired level of vulcanization is complete. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the rubber to be cured can be dynamically vulcanized in the presence of a portion of the thermoplastic olefinic resin. This blend can then be let down into additional thermoplastic olefinic resin. Similarly, it is not necessary to add all of the fillers and oil prior to dynamic vulcanization. Some or all of the fillers and oil can be added after the vulcanization is completed. In another embodiment of the invention, the elastomeric ethylene-vinyl acetate copolymer (b) is added after the elastomeric component (c) has been dynamically vulcanized in the presence of at least a portion of the thermoplastic olefinic resin.

The term "rubber" is used herein interchangeably with "elastomer".

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the less extractables of the cured rubber components, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation, as shown in J. Rubber Chem. and Tech. 30, p. 929. The appropriate Huggins solubility parameters for rubber solvent pairs used in the calculation were obtained from the review article by Sheehan and Bisio, J. Rubber Chem. & Tech. 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

The thermoplastic compositions of the present invention are particularly suitable for use in co-extrusion and co-injection molding with, for example, rigid polyvinyl chloride and highly plasticized vinyl.

PREFERRED EMBODIMENTS

The following examples are presented to illustrate the invention. All parts and percentages herein are by weight unless specifically stated otherwise. The ingredients used in the examples are shown in Table IV.

EXAMPLE 1

Comparative composition "Control" and Compositions A, B, and C, which are compositions in accordance with the present invention, described in Table I were mixed in a 3 lb. Banbury mixer using an 8 to 9 minute cycle. The mixtures were heated to 200° C. while stirring at a high rate of shear. At this temperature, the resin was in a molten state and the elastomer was dispersed within the resinous mass while undergoing cross-linking (dynamic vulcanization).

After completion of dynamic vulcanization, each blend was sheeted out on a cool mill and then ground for feed to a 15-ton Boy injection molding machine. Dumbbells were injection molded from each blend and compared in properties. The properties measured for each blend are reported in Table I. The test procedures employed in making the property measurements are identified in Table V.

In Table I, "Control" Composition was a composition similar to the compositions described in Hazelton et al.'s U.S. Pat. No. 4,894,408. It did not exhibit adhesion to plasticized PVC. Composition A, which was a composition in accordance with the invention, was obtained by substituting a high vinyl acetate EVA resin for a portion of the medium vinyl acetate EVA. It exhibited a useful level of adhesion to the PVC while maintaining good physical properties and low compression set. Adhesion is further improved by increasing the amount of high vinyl acetate copolymer (Composition B). The high VA ethylene vinyl acetate copolymer content was 18.5 weight percent of the total polymers in Composition A and 27.9 weight percent of the total polymers in Composition B. The inclusion of chlorinated polyethylene in combination with the high vinyl acetate EVA further improved adhesion to the plasticized PVC (polyvinyl chloride).

TABLE I

| Ingredients | Composition | | | |
| --- | --- | --- | --- | --- |
| | Control | A | B | C |
| Elastomer VISTALON 6505 | 27 | 27 | 27 | 27 |
| Base Resin LD 702.45 (12% VA. 0.3 MI) | 27 | 17 | 17 | 17 |
| Adhesion Promoting Resins | | | | |
| EY 904.25(52% VA, 3 MI) | | 10 | 17 | 10 |
| CPE 552 (36% Cl$_2$) | | | | 7 |
| Additives | | | | |
| Maglite D | — | — | — | 0.3 |
| Oil$^{(1)}$ | 25 | 25 | 25 | 25 |
| Atomite | 11.9 | 11.9 | 4.9 | 4.9 |
| Titanox 2071 | 3.0 | 3.0 | 3.0 | 3.0 |
| Stearic Acid | 0.5 | 0.5 | 0.5 | 0.5 |
| Stabilizer(s)$^{(2)}$ | 0.8 | 0.8 | 0.8 | 0.8 |
| Curatives | | | | |
| Zinc Oxide (Protox 169) | 0.8 | 0.8 | 0.8 | 0.8 |
| SP 1055 Resin | 3.7 | 3.7 | 3.7 | 3.7 |
| SnCl$_2$ | 0.3 | 0.3 | 0.3 | |
| Total | 100 | 100 | 100 | 100 |
| PROPERTIES | | | | |
| Spiral Flow, cm | 8.0 | 10.5 | 14.0 | 12.0 |
| Adhesion to PVC$^{(3)}$, lb/in | 0 | 1.5 | 2.9 | 4.6 |
| Vicat (200 g) °C. | 85 | 87 | 73 | 74 |
| Shore A Hardness (5 sec) | 66 | 56 | 55 | 55 |
| Tensile Strength, psi | 695 | 533 | 528 | 596 |
| Elongation, % | 260 | 300 | 440 | 340 |
| Compression Set method B | | | | |
| 22 Hrs. RT. % | 16 | 15 | 16 | 14 |
| 22 Hrs. 70 C., % | 56 | 47 | 57 | 46 |

$^{(1)}$Exxon PO 3085
$^{(2)}$0.1 Cyanox 1790; 0.4 Tinuvin 770; 0.2 Tinuvin 327; 0.1 Weston 626.
$^{(3)}$Plasticized compound. Values measured using a 180° angle peel type test.

TABLE II

| Ingredients | Composition D | E | F |
|---|---|---|---|
| Elastomer VISTALON 6505 | 27 | 27 | 27 |
| Base Resin | | | |
| LD 702.45 (12% VA. 0.3 MI) | 17 | — | — |
| Dowlex 4001 (LDPE) | — | 17 | — |
| Propylene random copolymer (6% ethylene, 5MFR) | — | — | 17 |
| Adhesion Promoting Resins | | | |
| EY 904.25 (52% VA, 3 MI) | 10 | 10 | 10 |
| CPE 552 (36% Cl$_2$) | 7 | 7 | 7 |
| Additives | | | |
| Maglite D | 0.3 | 0.3 | 0.3 |
| Oil[1] | 25 | 25 | 25 |
| Atomite | 4.9 | 4.9 | 4.9 |
| Titanox 2071 | 3.0 | 3.0 | 3.0 |
| Stearic Acid | 0.5 | 0.5 | 0.5 |
| Stabilizer(s)[2] | 0.8 | 0.8 | 0.8 |
| Curatives | | | |
| Zinc Oxide (Protox 169) | 0.8 | 0.8 | 0.8 |
| SP 1055 Resin | 3.7 | 3.7 | 3.7 |
| Total | 100 | 100 | 100 |
| PROPERTIES | | | |
| Spiral Flow, cm | 9.5 | 8.5 | 17.5 |
| Adhesion to PVC[3], lb/in | 4.5 | 1.2 | 0.2 |
| Vicat (200 g) °C. | 86 | 108 | 98 |
| Shore A Hardness (5 sec) | 61 | 63 | 65 |
| Tensile strength, psi | 637 | 676 | 597 |
| Elongation, % | 280 | 510 | 600 |
| Compression Set method B | | | |
| 22 Hrs. RT. % | 7 | 9 | 22 |
| 22 Hrs. 70 C., % | 46 | 41 | 61 |

[1]Exxon PO 3085
[2]0.1 Cyanox 1790; 0.4 Tinuvin 770; 0.2 Tinuvin 327, 0.1 Weston 626.
[3]Plasticized compound. Values measured using a 180° angle peel-type test.

The composition D of Table II confirmed the results of Table I. Composition D was the same as Composition C of Table I. Adhesion to polyvinyl chloride (PVC) was achieved when the major thermoplastic resin component was EVA as in Composition D or polyethylene as in Composition E, but not when the major thermoplastic resin component was polypropylene as in Composition F. Compositions D and E were compositions in accordance with the present invention. Composition F was not a composition in accordance with the present invention.

TABLE III

| | Composition | | | |
|---|---|---|---|---|
| | Control | | | |
| Ingredients | G | H | I | J |
| Elastomer Chlorobutyl 1066 | 27 | 27 | 27 | 27 |
| Base Resin | | | | |
| LD 702.45 | 27 | — | — | — |
| LD 702.45 | — | 20 | — | — |
| Escorene LL 1001.09 (LLDPE) | — | — | 15 | — |
| Dowlex 4001(LDPE) | — | — | — | 17 |
| Polyproplene random copolymer (6% Ethylene, 5 MFR) | — | — | — | — |
| Adhesion Promoting Resin | | | | |
| EY 904.25 (52% VA, 3 MI) | — | 7 | 12 | 10 |
| CPE 552 (36% C$_2$) | — | — | — | 7 |
| Additives | | | | |
| Maglite D | 1.2 | 1.2 | 1.2 | 1.0 |
| Oil[1] | 20 | 20 | 20 | 25 |
| Atomite | 17.1 | 17.1 | 17.1 | 4.6 |
| Titanox 2071 | 3.0 | 3.0 | 3.0 | 3.0 |
| Stearic Acid | 0.5 | 0.5 | 0.5 | 0.5 |
| Stabilizer(s)[2] | 0.1 | 0.1 | 0.1 | 0.8 |
| Curatives | | | | |
| Zinc Oxide (Protox 169) | 3.3 | 3.3 | 3.3 | 3.3 |
| Di-orthoguanidine salt of dicatechol borate (Permalux) | 0.8 | 0.8 | 0.8 | 0.8 |
| Total | 100 | 100 | 100 | 100 |
| PROPERTIES | | | | |
| Spiral Flow, cm | 13.0 | 9.5 | 6 | 10 |
| Adhesion to PVC[3], lb/in | 0.3 | 0.4 | 0.8 | 2.2 |
| Vicat (200 g) °C. | 78 | 85 | 104 | 95 |
| Shore A Hardness (5 sec) | 65 | 67 | 63 | 60 |
| Tensile strength, psi | 690 | 617 | 574 | 518 |
| Elongation, % | 308 | 210 | 240 | 330 |
| Compression Set method B | | | | |
| 22 Hrs. RT. % | 26 | 22 | 21 | 9 |
| 22 Hrs. 70 C., % | 88 | 60 | 47 | 35 |

[1]Circosol 4240 in Control and in H, & I; PO 3085 in J
[2]0.1 Irganox 1010 in Control, H and I, others: 0.1 Cyanox 1790; 0.4 Tinuvin 770; 0.2 Tinuvin 327, 0.1 Weston 626.
[3]Plasticized compound. Values measured using a 180° angle peel-type test.

Composition G was a DVA composition based on halobutyl elastomer similar to the DVA compositions described in U.S. Pat. No. 4,639,487. Thus, it was not a composition in accordance with the present invention. Adhesion to PVC was too low to be useful for that purpose. Composition H showed a threshold improvement resulting from the incorporation of high vinyl acetate EVA (13% of the total polymer content).

Composition I showed a improved level of adhesion with high VA EVA at 22% of the total polymer content. Composition J confirmed the effectiveness of polyethylene as a major component resin matrix (i.e., thermoplastic olefinic resin) and the added benefit of using chlorinated polyethylene as an additional adhesion promoting resin. Compositions H, I, and J were compositions in accordance with the present invention.

EXAMPLE 2

The compositions shown in Table IV were mixed in a 2800 ml internal mixer using a dynamic vulcanization process similar to that employed in Example 1. Compositions K, L, M, N, O and P of Table IV are compositions in accordance with the present invention. The thermoplastic olefinic resin component (a) in each of these formulations is a copolymer of ethylene and vinyl acetate in which the vinyl acetate content is 28 weight percent. The elastomeric copolymer component (b) has been selected for comparison purposes from a group of copolymers with vinyl acetate contents from 45 to 52 weight percent, and melt indices from about 3 to about 26. The dynamically vulcanized elastomeric component (c) is brominated butyl rubber, and the optional halogenated polyethylene is present as a chlorinated polyethylene. Good levels of adhesion to an unplasticized PVC substrate were obtained for all of compositions K-P. Adhesion improved as the percentage of vinyl acetate in the elastomeric ethylene vinyl acetate copolymer component was increased.

Compositions Q and R are not within the present invention. Composition Q contains a single ethylene vinyl acetate copolymer, as opposed to a combination of a lower vinyl acetate olefinic thermoplastic copolymer and an elastomeric high vinyl acetate component. Although the total vinyl acetate content of the composition is intermediate between that of inventive compositions L and M (13.2% vs. 13.84% and 13.07%), the adhesion to PVC is lower than for either. Further, composition Q lacks the higher softening point olefinic thermoplastic phase necessary to provide an adequate softening point for many practical applications. Comparative composition R lacks the elastomeric high vinyl acetate component (b) and has very low adhesion to PVC.

TABLE IV

| Ingredients | K | L | M | N | O | P | Q | R |
|---|---|---|---|---|---|---|---|---|
| Bromobutyl 2244 | 28.4 | 28.4 | 28.4 | 28.4 | 28.4 | 28.4 | 28.4 | 28.4 |
| EVA UL00328 (28% VA) | 29.0 | 29.0 | 29.0 | 29.0 | 29.0 | 29.0 | — | 33.0 |
| Levapren 400(40% VA) | — | — | — | — | — | — | 33.0 | — |
| Levapren 450 (45% VA) | — | — | 11.0 | — | — | — | — | — |
| Levapren 500 (50% VA) | — | — | — | 11.0 | — | — | — | — |
| Vynathene EY904 (52% VA) | 11.0 | 11.0 | — | — | 11.0 | — | — | — |
| Vynathene EY903 (45% VA) | — | — | — | — | — | 11.0 | — | — |
| Dow CPE 552 | 8.0 | — | — | 8.0 | — | — | — | — |
| Dow CPE XZ95707 | — | 8.0 | 8.0 | — | — | — | 15.0 | 15.0 |
| Dow CPE XZ95708 | — | — | — | — | 8.0 | 8.0 | — | — |
| Neutral 600 oil | 15.0 | 15.0 | 15.0 | 15.0 | 15.0 | 15.0 | 15.0 | 15.0 |
| DHT 4A | 0.3 | 0.3 | 0.3 | 0.3 | 0.3 | 0.3 | 0.3 | 0.3 |
| Translink 37 Clay | 5.0 | 5.0 | 5.0 | 5.0 | 5.0 | 5.0 | 5.0 | 5.0 |
| $TiO_2$—TR92 | 0.5 | 0.5 | 0.5 | 0.5 | 0.5 | 0.5 | 0.5 | 0.5 |
| Stearic acid | 0.2 | 0.2 | 0.2 | 0.2 | 0.2 | 0.2 | 0.2 | 0.2 |
| Cyanox 1790 | 0.1 | 0.1 | 0.1 | 0.1 | 0.1 | 0.1 | 0.1 | 0.1 |
| Weston 626 | 0.2 | 0.2 | 0.2 | 0.2 | 0.2 | 0.2 | 0.2 | 0.2 |
| Tinuvin 770 | 0.2 | 0.2 | 0.2 | 0.2 | 0.2 | 0.2 | 0.2 | 0.2 |
| Chimasorb 944 | 0.3 | 0.3 | 0.3 | 0.3 | 0.3 | 0.3 | 0.3 | 0.3 |
| Zinc oxide | 1.2 | 1.2 | 1.2 | 1.2 | 1.2 | 1.2 | 1.2 | 1.2 |
| HVA-2 | 0.6 | 0.6 | 0.6 | 0.6 | 0.6 | 0.6 | 0.6 | 0.6 |
| Adhesion to unplasticized PVC 90° angle peel test- lb./in | 16.5 | 14.6 | 10.7 | 14.2 | 14.4 | 11.9 | 9.6 | 2.5 |

TABLE V

| INGREDIENT | DESCRIPTION |
|---|---|
| D 722.62; (20% VA) Exxon Chemical Company | Ethylene-vinyl acetate copolymer, 20% vinyl acetate, MI 3 |
| LD-702.45 Exxon Chemical Company | Ethylene-vinyl acetate copolymer, 12% vinyl acetate, MI 0.3 |
| Escorene LL1001.09 Exxon Chemical Company | Linear Low Density Polyethylene 0.918 density; MI 1.0 |
| VISTALON 6505 Exxon Chemical Americas | Ethylene-propylene terpolymer, high diene level |
| Chlorobutyl 1066 Exxon Chemical Company | Chlorinated isoprene-isobutylene copolymer, 51–60 Mooney Viscosity (1 + 8) 100° C. |
| Dowlex 4001 Dow Chemical Company | Polyethylene (Type 1); 0.912 density; 3.3 melt index |
| Circosol 4240 oil Sun Oil Company | Naphthenic Oil, ASTM D2226, Type 103 |
| Atomite Thompson, Weinman & Co. | Natural ground calcium carbonate, mean particle size 3 microns |
| Maglite D C. P. Hall Company | Magnesium oxide |
| Irganox B-215 Ciba-Geigy | Tetrakis(methylene (3,5-di-tert-butyl-4-hydroxyhydrocinnamate) methane and tris 2,4-di-tert butylphenyl)phosphite(1:2 blend) |
| Irganox 1010 Ciba-Geigy | Tetrakis(methylene(3,5-di-Tert-butyl-4-hydroxyhydrocinnamate) methane |
| Stearic Acid | Long chain fatty acid |
| Protox 169 Zinc Oxide New Jersey Zinc Company | French process zinc oxide |
| Permalux DuPont Elastomer Chem.Co. | Di-ortho guanidine salt of dicatechol borate |
| CYANOX 1790 American Cyanamid | Tris (4-t-butyl-3-hydroxy-2,6-demethylbenyl)-5-trizaine-2,4,6-(1H, 3H, 5H)-trione |
| TINUVIN 770 Ciba-Geigy | Bis(2,2,6,6-tetramethyl-4-piperidylsebacate |
| TINUVIN 327 Ciba-Geigy | 2-(3', 5'-di-tert-butyl-2'-hydroxyphenyl)-5-chlorobenzotriazole |
| WESTON 626 GE Plastics Additives | Bis(2,4-di-t-butyl phenyl pentaerythritol diphosphite |
| SP 1055 (resin) Schenectady Chemical | Brominated alkyl phenol resin |
| TITANOX 2071 NL Industries, Inc. | Titanium dioxide |
| PO 3085 Exxon Corporation | Hydrocarbon rubber process oil |
| VYNATHENE EY 904.5 Quantum Chemical Corp. | Vinyl acetate ethylene copolymer, 52 wt. % vinyl acetate; 3 melt index |
| CPE 552 Dow Chemical Co. | Chlorinated polyethylene, 36% chlorine; Mooney Viscosity Melt Index (1 + 4) @ 121° C. = 68; specific gravity 1.16, amorphous |
| BROMOBUTYL 2244 Exxon Chemical Co. | Brominated isoprene-isobutylene copolymer; Mooney Viscosity (1 + 8) at 125° C. = 46 ± 5; 2 wt. % bromine |
| EVA UL 00328 Exxon Chemical Co. | Ethylene-vinyl acetate copolymer, 28 wt. % vinyl acetate; 0.3 Melt Index |
| LEVAPREN 400 Mobay Corporation | Ethylene-vinyl acetate copolymer 40 wt. % vinyl acetate |
| LEVAPREN 450 Mobay Corporation | Ethylene-vinyl acetate copolymer, 45 wt. % vinyl acetate; 22–30 Melt Index |
| LEVAPREN 500 Mobay Corporation | Ethylene-vinyl acetate copolymer, 50 wt. % vinyl acetate; 20 Melt Index |
| VYNATHENE EY 903 Quantum Chemical Corp. | Ethylene-vinyl acetate copolymer, 48 wt. % vinyl acetate; 7.5 Melt Index |
| Neutral 600 Oil Exxon Company U.S.A. | Hydrogenated paraffinic rubber process oil; 113 CST @ 40° C. |
| CPE XZ 95707 Dow Chemical Company | Chlorinated polyethylene, 40% chlorine |
| CPE XZ 95708 Dow Chemical Company | Chlorinated polyethylene, 35% chlorine |
| DHT 4A Kyowa Chemical Industry, Co., Ltd. | Magnesium aluminum hydroxy carbonate hydrate |
| Translink 37 Clay Englehardt Corp | Surface modified calcined Kaolin anhydrous aluminum silicate |
| $TiO_2$—TR92 | Titanium dioxide |
| Chimasorb 944 Ciba Geigy | Poly((6-((1,1,3,3-tetramethyl-butyl)amino)-s-triazine-2,4-diyl)((2,2,6,6-tetramethyl-4-piperidyl)imino) hexamethylene ((2,2,6,6-tetramethyl-4-piperidyl) imino)) |

Footnote: MI means Melt Index

TABLE VI

| TEST | TEST METHOD |
|---|---|
| Shore A Hardness, 5 sec. | ASTM D2240 |

TABLE VI-continued

| TEST | TEST METHOD |
| --- | --- |
| Tensile Strength, psi | ASTM D412 |
| Ultimate Elongation, % | ASTM D412 |
| Compression Set Method B | ASTM D395 |
| 22 Hrs. RT, % | |
| 22 Hrs. 70° C., % | |
| Spiral Flow, cm | See Note (1) |
| Adhesion, lb/in. | See Note (2) |
| Vicat (200 g), °C. | ASTM D1525 |
| Melt Index | ASTM 1238 |
| Condition E | |
| Density, gm/cm3 | ASTM D1505 |

(1) The spiral flow method is performed by injecting the composition to be tested at a nozzle temperature of 220° C. and a pressure of 800 psi into a spiral mold containing a pathway of semi-circular cross section having a diameter of 0.3 cm, and measuring the length of the portion of the pathway filled by the composition.
(2) Molded sheets of PVC and the respective test compositions, each approximately ⅛ inch thick, were pressed together at a temperature sufficient to soften both materials. After cooling, the bonded sheets were cut into 0.5 inch strips and the force required to separate them was measured using a 90 or 180 degree angle peel test performed on an Instron ® tensile test machine.

EXAMPLE 3

Dynamically vulcanized blends prepared from the following components would also be expected to have good adhesion to PVC substrates.

| Elastomer | |
| --- | --- |
| Natural rubber (#1 smoked sheets) | 28 wt. % |
| Base Resin | |
| EVA (28% vinyl acetate; 3 MI) | 24 wt. % |
| Adhesion Promoting Resins | |
| VAE (52% vinyl acetate; 3 MI) | 12 wt. % |
| Chlorinated polyethylene (36% chlorine) | 8 wt. % |
| Additives | |
| Magnesium oxide | 0.5 wt. % |
| Stabilizers | 1 wt. % |
| Rubber process oil | 18 wt. % |
| Calcium carbonate mineral filler | 5 wt. % |
| Curatives | |
| Zinc oxide | 1.5 wt. % |
| SP 1055 resin | 2 wt. % |

What is claimed is:

1. A thermoplastic composition having improved adhesion characteristics comprising a dynamically vulcanized polymer blend of:
   (a) about 15 to about 60 weight percent of a thermoplastic non-elastomeric copolymer of ethylene and vinyl acetate containing less than about 30 weight percent vinyl acetate;
   (b) from 14 to about 40 weight percent of an elastomeric ethylene-vinyl acetate copolymer having a vinyl acetate content of at least about 45 weight percent to about 70 weight percent; and
   (c) about 20 to about 70 weight percent of an at least partially vulcanized elastomeric copolymer selected from the group consisting of a copolymer of a $C_{4-7}$ isomonoolefin and a $C_{4-14}$ multiolefin; a halogenated copolymer of $C_{4-7}$ isomonoolefin and a $C_{4-14}$ multiolefin; a halogenated copolymer of a $C_{4-7}$ isomonoolefin and a para-alkylstyrene; a terpolymer of ethylene, at least one higher alpha olefin and at least one non-conjugated diene; a terpolymer of a $C_{4-7}$ isomonoolefin, a $C_{4-14}$ multiolefin and a divinyl aromatic monomer; and mixtures thereof.

2. The thermoplastic composition of claim 1, wherein said thermoplastic copolymer (a) is present in an amount ranging from about 20 to 40 weight percent, said elastomeric ethylene-vinyl acetate copolymer is present in an amount ranging from 14 to 30 weight percent and said elastomeric copolymer (c) is present in an amount ranging from about 30 to 60 weight percent, based on said polymer blend.

3. The thermoplastic composition of claim 1, wherein said elastomeric copolymer (c) is selected from the group consisting of a chlorobutyl rubber, an ethylene-propylene-diene rubber, a halogenated copolymer of a $C_4$ to $C_7$ isomonoolefin and a para-alkylstyrene, and mixtures thereof.

4. The thermoplastic composition of claim 1, also comprising a halogenated polyethylene.

5. The thermoplastic composition of claim 4, wherein said halogenated polyethylene is selected from the group consisting of chlorinated polyethylene, brominated polyethylene, and mixtures thereof.

6. The thermoplastic composition of claim 4, wherein said halogenated polyethylene is chlorinated polyethylene.

7. The thermoplastic composition of claim 4, wherein said halogenated polyethylene is present in an amount ranging from about 5 to about 30 weight percent, based on said polymer blend.

8. The thermoplastic composition of claim 1, also comprising fillers, plasticizers, and other rubber compounding additives.

9. A process for preparing a dynamically vulcanized thermoplastic composition having improved adhesion characteristics, which comprises the steps of:
   (i) blending (a) about 15 to about 60 weight percent of a thermoplastic non-elastomeric copolymer of ethylene and vinyl acetate containing less than about 30 weight percent vinyl acetate; (b) from 14 to about 40 weight percent of an elastomeric ethylene-vinyl acetate copolymer having a vinyl acetate content of at least about 45 weight percent to about 70 weight percent; (c) about 20 to about 70 weight percent of an elastomeric copolymer selected from the group consisting of a copolymer of a $C_{4-7}$ isomonoolefin and a $C_{4-14}$ multiolefin; a halogenated copolymer of $C_{4-7}$ isomonoolefin and a $C_{4-14}$ multiolefin; a halogenated copolymer of a $C_{4-7}$ isomonoolefin and a para-alkylstyrene; a terpolymer of ethylene, at least one higher alpha olefin and at least one non-conjugated diene; a terpolymer of a $C_{4-7}$ isomonoolefin, a $C_{4-14}$ multiolefin and a divinyl aromatic monomer; and mixtures thereof; and a vulcanization agent capable of vulcanizing at least said elastomeric copolymer (c); and
   (ii) masticating and shearing the blend resulting from step (i) at vulcanization conditions for a time sufficient to produce a dynamically vulcanized thermoplastic composition wherein said elastomeric copolymer (c) is at least partially vulcanized.

10. The process of claim 9, wherein said component (b) is omitted from said blending step and wherein said component (b) is added after said elastomeric copolymer (c) is at least partially vulcanized.

11. The process of claim 9, wherein said elastomeric copolymer (c) is substantially fully vulcanized.

12. The process of claim 9, wherein said vulcanization conditions include a temperature ranging from about the melting point of said thermoplastic olefinic resin to about 250° C.

13. The process of claim 9, wherein said composition additionally comprises a halogenated polyethylene polymer and wherein said halogenated polyethylene polymer is added before or after step (ii).

14. The process of claim 13, wherein said halogenated polyethylene is chlorinated polyethylene.

15. The process of claim 9, wherein said elastomeric copolymer (c) is selected from the group consisting of chlorobutyl rubber, an ethylene-propylene-diene rubber, a halogenated copolymer of a $C_4$ to $C_7$ isomonoolefin and a para-alkylstyrene, and mixtures thereof.

16. The process of claim 15, wherein said composition additionally comprises a chlorinated polyethylene in an amount ranging from about 5 to about 30 weight percent, based on the weight of the sum of components (a), (b), (c) plus said chlorinated polyethylene.

* * * * *